United States Patent
Yu et al.

(10) Patent No.: US 8,031,115 B2
(45) Date of Patent: Oct. 4, 2011

(54) NAVIGATION SYSTEM WITH A SIGNAL PROCESSOR

(75) Inventors: Xiaoguang Yu, Wuhan (CN); Weihua Zhang, Sichuan (CN); James Wang, San Jose, CA (US)

(73) Assignee: O2Micro Inc., Santa Clara, CA (US)

( * ) Notice: Subject to any disclaimer, the term of this patent is extended or adjusted under 35 U.S.C. 154(b) by 36 days.

(21) Appl. No.: 12/650,243

(22) Filed: Dec. 30, 2009

(65) Prior Publication Data
US 2011/0006946 A1    Jan. 13, 2011

Related U.S. Application Data

(60) Provisional application No. 61/205,526, filed on Jan. 21, 2009.

(51) Int. Cl.
*G01S 19/30* (2010.01)
(52) U.S. Cl. .................................. 342/357.69
(58) Field of Classification Search ............. 342/357.69
See application file for complete search history.

(56) References Cited

U.S. PATENT DOCUMENTS

| | | | | |
|---|---|---|---|---|
| 4,578,678 | A | * | 3/1986 | Hurd ........................ 342/357.25 |
| 4,807,256 | A | * | 2/1989 | Holmes et al. ................. 375/344 |
| 4,894,662 | A | * | 1/1990 | Counselman ............ 342/357.25 |
| 5,343,209 | A | * | 8/1994 | Sennott et al. ........... 342/357.29 |
| 6,154,171 | A | | 11/2000 | Sullivan |
| 7,667,627 | B2 | * | 2/2010 | Tsu et al. ........................ 341/70 |
| 7,705,778 | B2 | * | 4/2010 | Sun et al. ................. 342/357.69 |
| 2006/0227046 | A1 | | 10/2006 | Piazza |
| 2008/0298526 | A1 | * | 12/2008 | Wang ............................ 375/359 |
| 2010/0083218 | A1 | * | 4/2010 | Bender ........................ 717/106 |

OTHER PUBLICATIONS

Extended European Search Report received in European Application No. 10151295.2 dated May 3, 2010. (6 pages).

* cited by examiner

*Primary Examiner* — Thaomas Tarcza
*Assistant Examiner* — Frank McGue (57) ABSTRACT

A signal processor for processing multiple satellite signals is disclosed. The signal processor includes multiple acquisition channels operable for capturing tracking information from a first plurality of satellite signals synchronously according to multiple correlations between multiple reference coarse acquisition (C/A) codes and the first plurality of satellite signals. The signal processor further includes multiple code generators coupled to the acquisition channels and operable for generating the reference C/A codes to the acquisition channels.

20 Claims, 5 Drawing Sheets

NAVIGATION SYSTEM WITH A SIGNAL PROCESSOR

RELATED APPLICATION

This application claims priority to U.S. Provisional Application No. 61/205,526, "Satellite Navigation System with a Base-Band Signal Processor," filed on Jan. 21, 2009, which is hereby incorporated by reference in its entirety.

BACKGROUND

Figure 1:
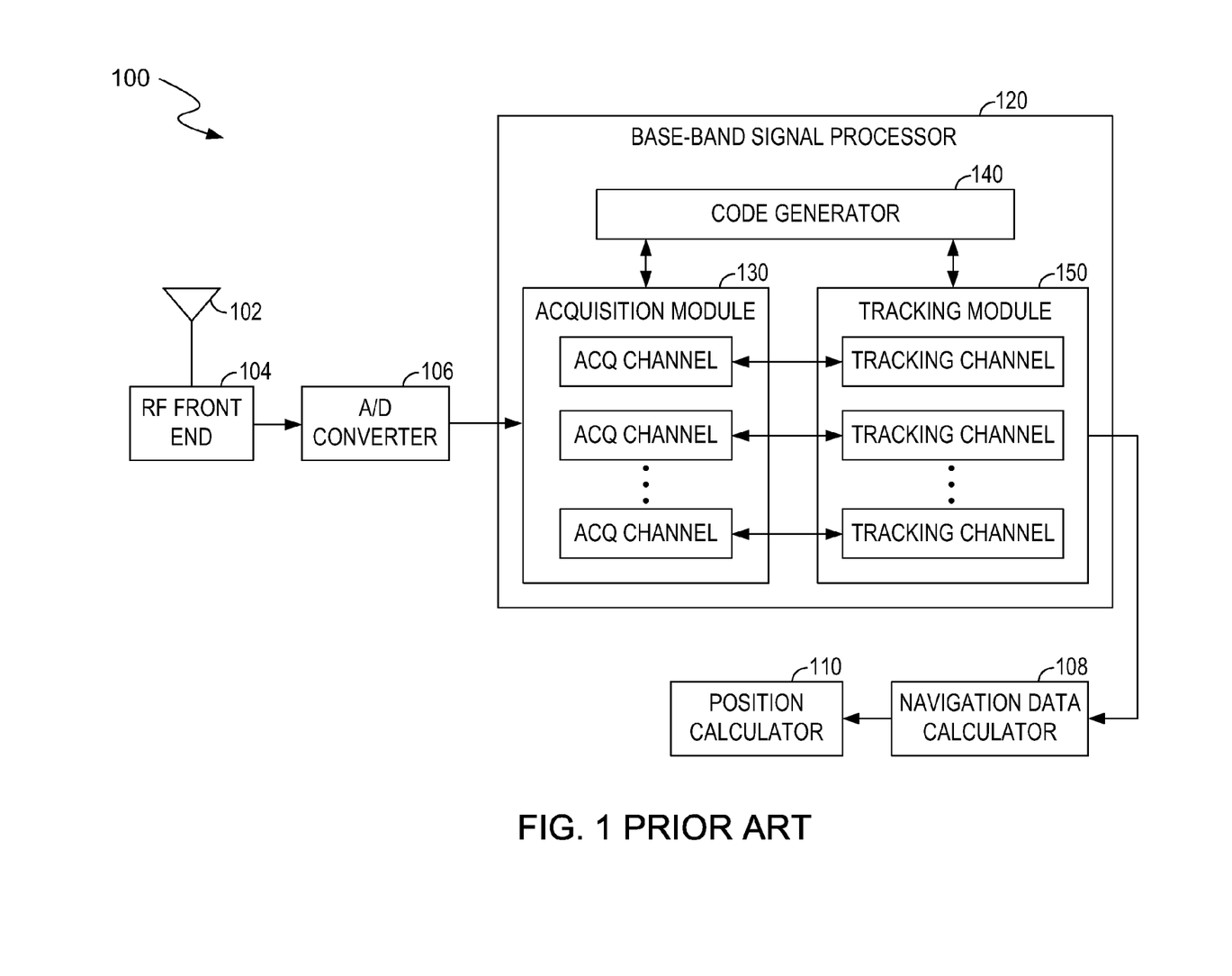
FIG. 1 illustrates a block diagram of a satellite navigation system with a conventional base-band signal processor.

Generally, a satellite navigation system such as a global positioning system (GPS) receiver can be used to receive satellite signals from various satellites and to process the satellite signals. A base-band signal processor included in the satellite navigation system can capture tracking information from available satellite signals and track the corresponding satellites according to the tracking information. FIG. 1 illustrates a block diagram of a satellite navigation system 100 with a conventional base-band signal processor. As shown in FIG. 1, the satellite navigation system 100 includes a radio frequency (RF) front end 104 for receiving satellite signals from various satellites via an antenna 102 and for converting the frequency of the satellite signals from a RF to an intermediate frequency. An analog-to-digital converter 106 can digitize the satellite signals at a predetermined sampling frequency and generate a digital satellite signal, which can be also called a base-band signal, to an acquisition module 130 in a base-band signal processor 120. The acquisition module 130 can include multiple acquisition channels to capture tracking information from the base-band signal. A tracking module 150 including multiple tracking channels can receive the tracking information from the acquisition module 130, track the corresponding satellites according to the tracking information and output navigation information. A navigation data calculator 108 and a position calculator 110 can calculate a position of the satellite navigation system 100 according to navigation information from the tracking module 150.

In the base-band signal processor 120, the acquisition channels and the tracking channels may share a single code generator 140 which can generate local carrier codes and coarse acquisition (C/A) codes used in the satellite signals. The code generator 140 may work with only one acquisition channel or only one tracking channel at a certain time. Since each of the acquisition channels and each of the tracking channels require a code generator during operation, the acquisition channels and the tracking channels may not operate synchronously. Furthermore, a set of satellites are fixed to each of the acquisition channels, and each acquisition channel captures tracking information from the satellite signals output from the fixed set of the satellites. Also, the satellite tracked by each of the tracking channels is fixed and may not be adjusted during the operation of the satellite navigation system 100, which may further decrease the system efficiency and flexibility.

SUMMARY

In one embodiment, a signal processor for processing multiple satellite signals is disclosed. The signal processor includes multiple acquisition channels operable for capturing tracking information from a first plurality of satellite signals synchronously according to multiple correlations between multiple reference coarse acquisition (C/A) codes and the first plurality of satellite signals. The signal processor further includes multiple code generators coupled to the acquisition channels and operable for generating the reference C/A codes to the acquisition channels.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a satellite navigation system with a base-band signal processor. In one such embodiment, in the base-band signal processor, available acquisition channels can be selected to capture tracking information from received satellite signals. Available tracking channels can be selected to track the corresponding satellites based on the tracking information output from the acquisition channels. Available code generators can be selected to generate local carried codes and reference C/A codes to the selected acquisition channels and tracking channels.

Each satellite can modulate the navigation message into a unique coarse acquisition (C/A) code. The C/A code can be a standard pseudorandom noise code. The satellite can modulate the C/A code with the navigation message into a local carrier code. The local carrier code carrying the navigation message and the C/A code can be seen as a satellite signal. The satellite can transmit the satellite signal to Earth. The satellites use the same local carrier code for carrying the navigation message. The frequencies of the satellite signals are the same as the frequency of the local carrier code. Hence, the satellite signals can be automatically merged into one satellite signal.

Figure 2:
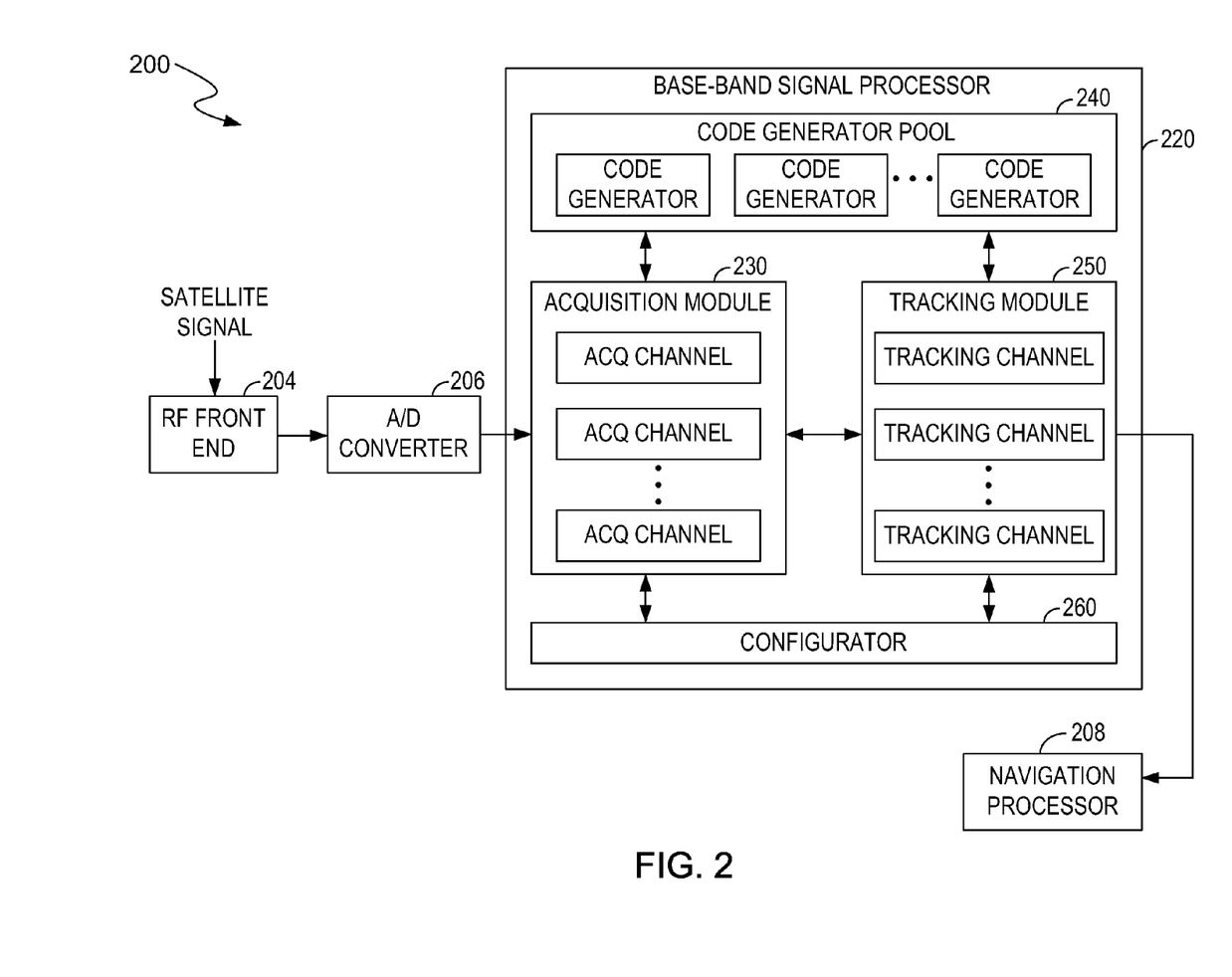
FIG. 2 illustrates a block diagram of a satellite navigation system with a base-band signal processor, in accordance with one embodiment of the present invention.

FIG. 2 illustrates a block diagram of a navigation system 200 with a signal processor, e.g., a base-band signal processor 220, in accordance with one embodiment of the present invention. In one embodiment, the navigation system 200 is a satellite navigation system. The base-band signal processor 220 can include an acquisition module 230, a code generator pool 240, a tracking module 250, and a configurator 260. The acquisition module 230 includes multiple acquisition (ACQ) channels. The tracking module 250 includes multiple tracking channels.

A radio frequency (RF) front end 204 can receive the satellite signal and convert the frequency of the satellite signal from a RF to an intermediate frequency (IF). An analog-to-digital converter 206 can digitize the satellite signal at a predetermined sampling frequency and generate a digital satellite signal, which can be called a base-band signal, to the base-band signal processor 220.

The configurator 260 can select a set of available acquisition (ACQ) channels in the acquisition module 230 to receive the base-band signal. Furthermore, the configurator 260 can allocate a set of satellites to each selected ACQ channel. Each selected ACQ channel can capture tracking information from the satellite signals included in the base-band signal according to correlations between reference C/A codes for the allocated satellites and the base-band signal. The configurator 260 can further select multiple available code generators in the code generator pool 240. Each of the selected code generators can be allocated to each of the selected ACQ channels.

When an ACQ channel starts to operate, the ACQ channel can instruct the corresponding code generator to generate the local carrier codes and reference C/A codes for the allocated satellites. The reference C/A codes have an initial phase. The ACQ channel can determine whether the satellite signals output from the allocated satellites are included in the base-band signal by calculating correlations between the reference C/A codes for the allocated satellites and the base-band signal.

More specifically, when the ACQ channel receives a reference C/A code from the code generator, the ACQ channel can shift the initial phase of the reference C/A code multiple times with multiple predetermined values and calculate correlations between the reference C/A code with phases shifted by the predetermined values from the initial phase and the base-band signal.

If a maximal value of the correlations is higher than a predetermined threshold, then it can be determined that the satellite signal output from the satellite is included in the base-band signal. The ACQ channel can capture the tracking information from the satellite signal according to the reference C/A code. The tracking information can include, but is not limited to, identification, Doppler frequency shift information and C/A code phase shift information.

When the ACQ channels obtain the tracking information from the satellite signals, the configurator 260 can select a set of available tracking channels in the tracking module 250 to receive the tracking information from the ACQ channels. In one embodiment, one tracking channel can be configured to receive tracking information for a satellite signal from an ACQ channel and track the corresponding satellite according to the tracking information. In another embodiment, multiple tracking channels can receive tracking information for the same satellite signal and track the same satellite according to the tracking information for improved stability. The configurator 260 can further select multiple available code generators in the code generator pool 240 and allocate each of the selected code generators to each of the tracking channels.

When a tracking channel receives the tracking information for a satellite signal, the tracking channel can get the Doppler frequency shift information and the C/A code phase shift information from the tracking information. The code generator can generate a C/A code and a local carrier code according to the Doppler frequency shift information and the C/A code phase shift information. The tracking channel can track the corresponding satellite according to the tracking information, the C/A code and the local carrier code, and obtain navigation information.

Furthermore, when an ACQ/tracking channel completes its operation, the corresponding code generator can be available for other ACQ/tracking channels.

The satellite navigation system 200 further includes a navigation processor 208 to calculate a position of the satellite navigation system 200 according to the navigation information output from the tracking channels.

Advantageously, since a separate code generator is allocated to each of the selected ACQ channels and tracking channels, the selected ACQ channels and tracking channels can operate simultaneously. Furthermore, satellites allocated to each of the selected ACQ channels are not fixed and can be adjusted based on current conditions. Hence, the base-band signal processor 220 can achieve improved efficiency and flexibility.

Figure 3:
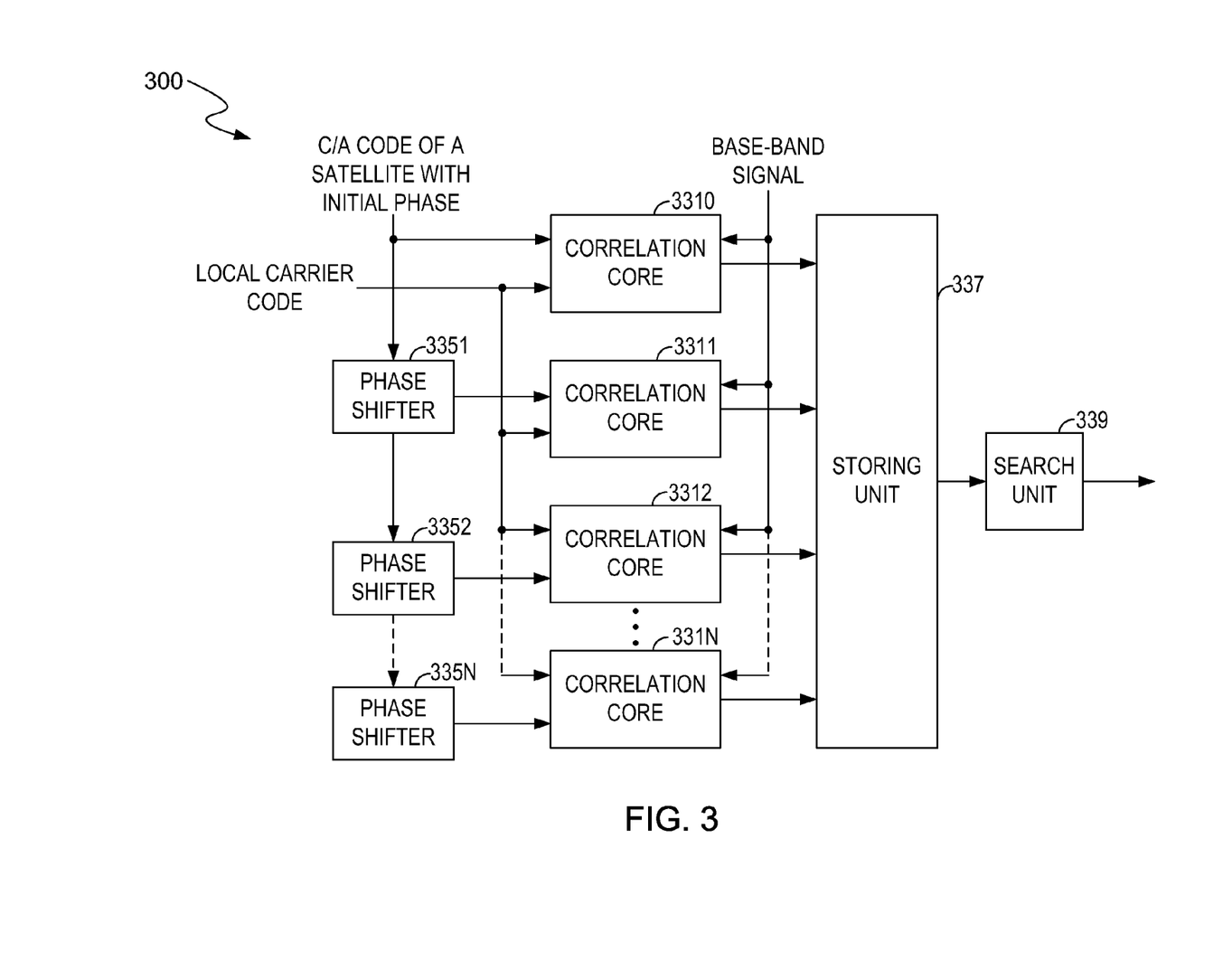
FIG. 3 illustrates a block diagram of an acquisition channel, in accordance with one embodiment of the present invention.

FIG. 3 illustrates a block diagram of an acquisition (ACQ) channel 300, e.g., one of the ACQ channels in the acquisition module 230 in FIG. 2, in accordance with one embodiment of the present invention. FIG. 3 is described in combination with FIG. 2.

The ACQ channel 300 includes a predetermined number of correlation cores 3310-331N for calculating correlations between the input C/A codes with phases shifted from the initial phase sequentially and the base-band signal, in one embodiment. The C/A code is a periodic signal, and a period of the C/A code can include 1023 chips, in one embodiment. The initial phase of the C/A code can be the beginning of one period. The ACQ channel 300 further includes multiple phase shifters 3351-335N for shifting the phase of an input C/A code by a predetermined value.

When the ACQ channel 300 receives the base-band signal, the ACQ channel 300 can capture tracking information from multiple satellite signals included in the base-band signal according to correlations between the reference C/A codes for the allocated satellites and the base-band signal.

For each of the allocated satellites, the ACQ channel 300 can instruct the corresponding code generator, which is one of the code generators in the code generator pool 240, to generate a reference C/A code for the satellite with an initial phase and generate a local carrier code. The local carrier code can be input to each correlation core. Furthermore, the reference C/A code with the initial phase can be input into the correlation core 3310 and a phase shifter 3351.

In one embodiment, the first phase shifter 3351 can shift the initial phase of the C/A code by a first predetermined value $P_1$ and output a C/A code with a $P_1$ phase-shift relative to the initial phase to the correlation core 3311. The second phase shifter 3352 can shift the phase of the C/A code from the first phase shifter 3351 by a second predetermined value $P_2$ and output a C/A code with a $(P_1+P_2)$ phase-shift relative to the initial phase to the correlation core 3312. Similarly, the phase shifter 335K ($2<K\leqq N$) can shift the phase of the C/A code from the previous phase shifter 335(K−1) by a $K^{th}$ predetermined value $P_K$ and output a C/A code with a $(P_1+P_2+\ldots+P_K)$ phase-shift relative to the initial phase to the corresponding correlation core 331K.

For example, the first phase shifter 3351 can shift the initial phase of the C/A code by 1/M chip(s) and output a C/A code with a 1/M chip(s) phase-shift relative to the initial phase to the correlation core 3311. The second phase shifter 3352 can shift the phase of the C/A code output from the first phase shifter 3351 by 1/M chip(s) and output a C/A code with a 2/M chip(s) phase-shift relative to the initial phase to the correlation core 3312. Similarly, the phase shifter 335K ($2<K\leq N$) can shift the phase of the C/A code output from the previous phase shifter 335(K−1) by 1/M chip(s) and output a C/A code with a K/M chip(s) phase-shift relative to the initial phase to the corresponding correlation core 331K.

Subsequently, each correlation core 331K ($0<K\leq N$) can calculate a correlation between a corresponding C/A code with the ($P_1+P_2+\ldots+P_K$) phase-shift and the base-band signal by multiplying the base-band signal, the corresponding C/A code and the local carrier code, and obtain a correlation result.

A storing unit 337 can be used for storing the correlation results of the correlation cores 3310-331N. A search unit 339 can fetch the correlation results from the storing unit 337 and select a maximal correlation result from the correlation results, in one embodiment. If the maximal correlation result exceeds a predetermined threshold, then it can be determined that the corresponding satellite signal output from the satellite is included in the base-band signal. Then the ACQ channel 300 can obtain the tracking information including identification, Doppler frequency shift information and C/A code phase shift information for the satellite signal according to the maximal correlation result, in one embodiment. If the maximal correlation result does not exceed the predetermined threshold, then it can be determined that the corresponding satellite is not included in the base-band signal.

After determining whether a satellite signal output from one of the allocated satellites is included in the base-band signal, the ACQ channel 300 can continue to determine whether a satellite signal output from a next one of the allocated satellites is included in the base-band signal. After determining whether the satellite signals output from all the allocated satellites are included in the base-band signal, the ACQ channel 300 can capture the tracking information from the satellite signals which are included in the base-band signal and output to the tracking module 250 for further processing.

Figure 4:
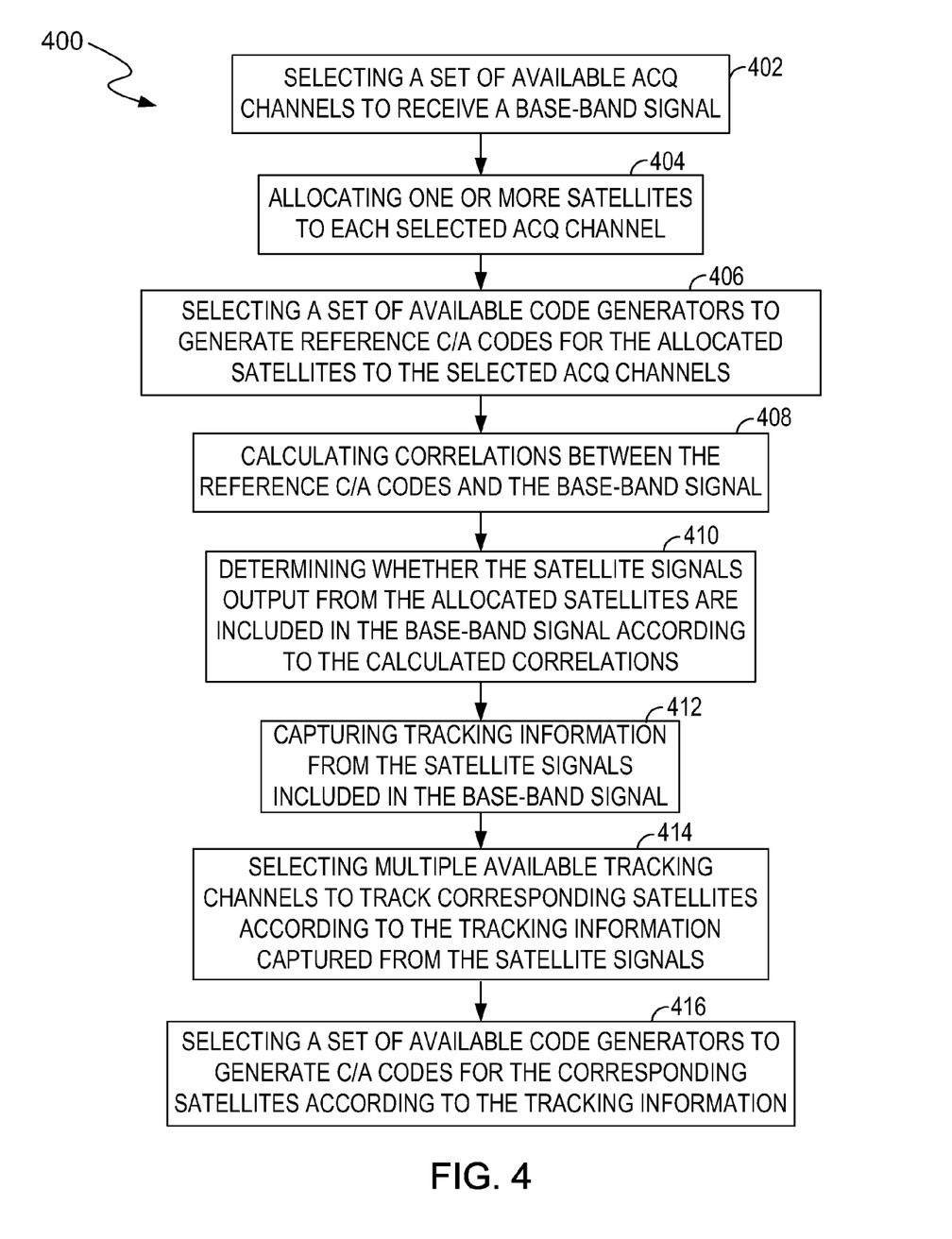
FIG. 4 illustrates a flowchart of operations performed by a base-band signal processor, in accordance with one embodiment of the present invention.

FIG. 4 illustrates a flowchart 400 of operations performed by a base-band signal processor, e.g., the base-band signal processor 220 in FIG. 2, in accordance with one embodiment of the present invention. FIG. 4 is described in combination with FIG. 2.

When a base-band signal is input into the base-band signal processor 220, the configurator 260 can select a set of available acquisition (ACQ) channels in the acquisition module 230 to receive the base-band signal in block 402. In block 404, the configurator 260 can allocate one or more satellites for each ACQ channel. In block 406, the configurator 260 can select multiple available code generators in the code generator pool 240 and allocate each of the selected code generators to each of the selected ACQ channels. The selected code generators can generate reference C/A codes for the allocated satellites with an initial phase to the selected ACQ channels.

In block 408, each ACQ channel can calculate the correlations between the reference C/A codes and the base-band signal. In block 410, each of the selected ACQ channels can determine whether the satellite signals output from the allocated satellites are included in the base-band signal according to the calculated correlations. In block 412, the ACQ channels captures tracking information from the satellite signals which are included in the base-band signal. The tracking information can include, but is not limited to, the identification, the Doppler frequency shift information and the C/A code phase shift information for the satellite signals.

In block 414, the configurator 260 can select multiple available tracking channels in the tracking module 250 to track corresponding satellites according to the tracking information captured from the satellites signals captured by the ACQ channels. In one embodiment, one tracking channel can track one satellite according to the tracking information captured from one satellite signal. In another embodiment, multiple tracking channels can track the same satellite according to the tracking information captured from the same satellite signal for improved stability. In block 416, available code generators in the code generator pool 240 can be selected to generate reference C/A codes according to the tracking information captured from the satellite signals to the available tracking channels for tracking the corresponding satellites.

Figure 5:
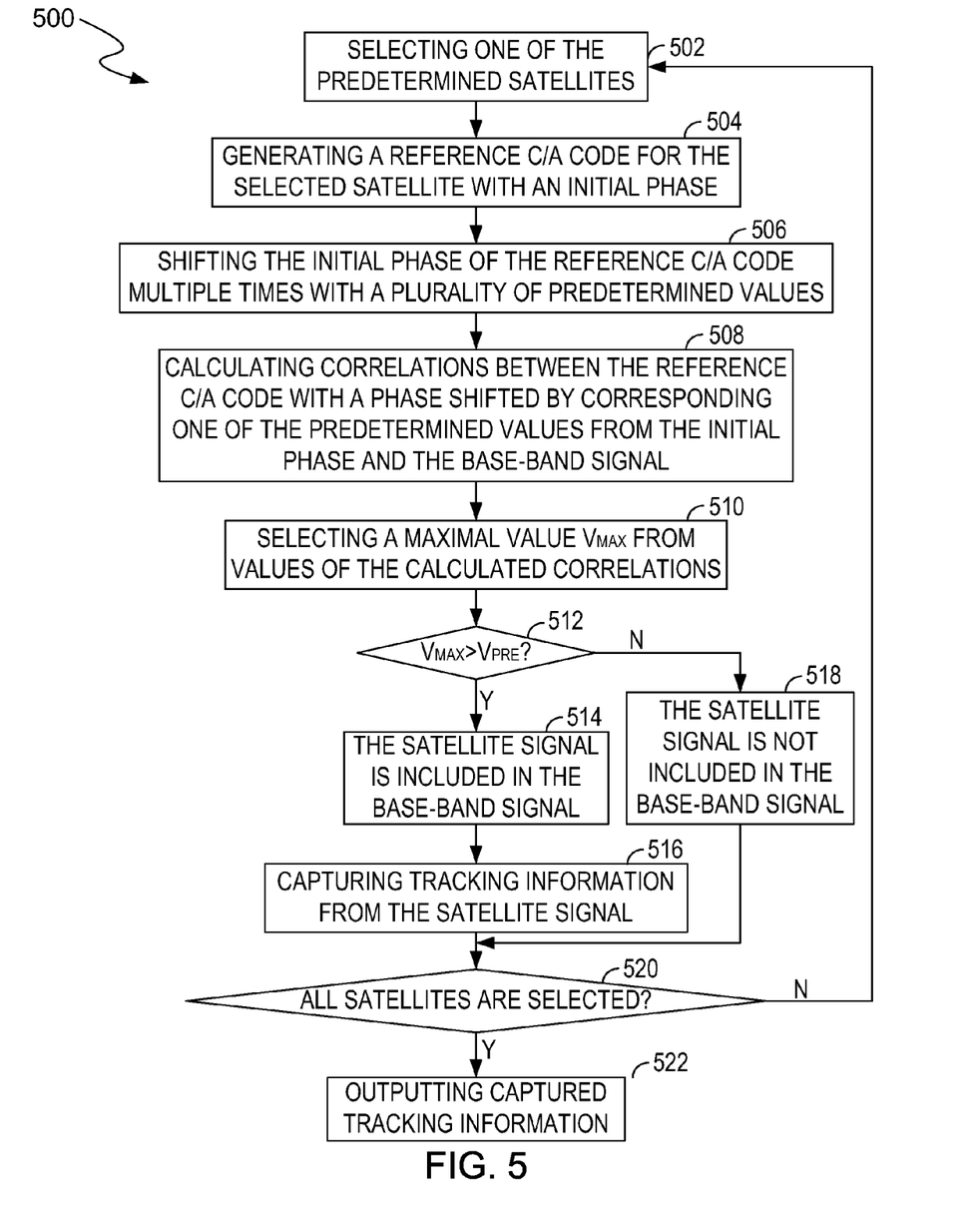
FIG. 5 illustrates a flowchart of operations performed by an acquisition channel, in accordance with one embodiment of the present invention.

FIG. 5 illustrates a flowchart 500 of operations performed by an ACQ channel, e.g., the ACQ channel 300 in FIG. 3, in accordance with one embodiment of the present invention. FIG. 5 is described in combination with FIG. 3. When a base-band signal is input into the ACQ channel 300, the ACQ channel 300 can start to capture tracking information from multiple satellite signals included in the base-band signal according to correlations between reference C/A codes for the allocated satellites and the base-band signal.

In block 502, the ACQ channel 300 can select a satellite from the allocated satellites. In block 504, a code generator can generate a reference C/A code for the selected satellite with an initial phase. In block 506, the initial phase of the reference C/A code can be shifted by multiple predetermined values. The C/A code with phases shifted by the predetermined values from the initial phase can be input into the correlation cores 3310-331N. In one embodiment, the initial phase of the reference C/A code can be shifted by K/M chip(s) for each correlation core 331K ($0<K\leq n$) and the C/A code with the K/M chip(s) phase-shift can be input into the corresponding correlation core 331K.

In block 508, each correlation core can calculate a value of a correlation between the reference C/A code with a phase shifted by corresponding one of the predetermined values from the initial phase and the base-band signal.

In block 510, a maximal value of the values of the correlations calculated by the correlation cores 3310-331N can be selected. In one embodiment, the correlation cores 3310-331N can send the calculated values of the correlations to the storing unit 337. The search unit 339 can fetch the values of the correlations from the storing unit 337 and select a maximal value from the fetched values. In block 512, if the maximal value ($V_{MAX}$) exceeds a predetermined threshold ($V_{PRE}$), then it can be determined that the satellite signal output from the selected satellite is included in the base-band signal in block 514. In block 516, the ACQ channel 300 can capture the tracking information including, but not limited to, the identification, the Doppler frequency shift information and the C/A code phase shift information for the satellite signal. In block 512, if the maximal value ($V_{MAX}$) does not exceed the predetermined threshold ($V_{PRE}$), then it can be determined that the satellite signal output from the selected satellite is not included in the base-band signal in block 518. In block 520, if all the allocated satellites have been selected, the ACQ channel 300 can output the captured tracking information from the satellite signals for further work in block 522. Otherwise, the flowchart 500 returns to block 502 to select a next satellite from the allocated satellites.

Accordingly, embodiments in accordance with the present invention provide a navigation system with a base-band signal processor 220. In the base-band signal processor 220, multiple acquisition (ACQ) channels and multiple tracking channels can share multiple code generators. When the base-band signal processor 220 receives a base-band signal including multiple satellite signals, a set of available ACQ channels can be selected to receive the base-band signal. Furthermore, one or more satellites can be allocated to each of the selected ACQ channels. Additionally, an available code generator in the code generator pool can be selected and then allocated to each of the selected ACQ channels. The ACQ channels can instruct the code generators to generate reference C/A codes for the allocated satellites. Each of the selected ACQ channels can capture tracking information from the satellite signals included in the base-band signal according to correlations between the reference C/A codes for the allocated satellites and the base-band signal. When an ACQ channel capture the tracking information from a satellite signal, an available tracking channel in the tracking module can be selected to receive the tracking information from the ACQ channel and track the corresponding satellite according to the tracking information.

Advantageously, since a separate code generator is allocated to each of the selected ACQ channels and tracking channels, the selected ACQ channels and tracking channels can operate simultaneously. Furthermore, satellites allocated to each of the selected ACQ channels are not fixed and can be adjusted based on current conditions. Hence, the base-band signal processor 220 can achieve improved efficiency and flexibility.

The embodiments that have been described herein, however, are but some of the several that utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A signal processor comprising:
   a plurality of acquisition channels operable for capturing tracking information from a first plurality of satellite signals synchronously according to a plurality of correlations between a plurality of reference coarse acquisition (C/A) codes and said first plurality of satellite signals;
   a first plurality of code generators coupled to said acquisition channels and operable for generating said reference C/A codes to said acquisition channels; and
   a configurator coupled to said acquisition channels and operable for selecting an available acquisition channel and selecting an available code generator and for allocating said available code generator to said available acquisition channel.

2. The signal processor of claim 1, wherein each of said acquisition channels determines whether, according to said correlations, a second plurality of satellite signals are included in said first plurality of satellite signals, and wherein each of said acquisition channels also captures tracking information from instances of said second plurality of satellite signals.

3. The signal processor of claim 1, wherein said configurator is further operable for allocating a plurality of satellites to each of said acquisition channels, wherein said acquisition channels instruct said first plurality of code generators to generate said reference C/A codes for said allocated satellites.

4. The signal processor of claim 1, wherein each of said acquisition channels comprises:
   a plurality of phase shifters, each of said phase shifters operable for shifting an initial phase of one of said reference C/A codes with a predetermined value; and
   a plurality of correlation cores coupled to said phase shifters, each of said correlation cores operable for calculating instances of said correlations, wherein each of said correlations is between said one of said reference C/A codes with a phase shifted by a corresponding one of said phase shifters and said satellite signals.

5. The signal processor of claim 1, further comprising a plurality of tracking channels coupled to said acquisition channels and operable for tracking corresponding satellites synchronously according to said tracking information captured from said first plurality of satellite signals, wherein said configurator is further operable for selecting an available tracking channel to receive tracking information from said available acquisition channel.

6. The signal processor of claim 5, further comprising a second plurality of code generators coupled to said tracking channels and operable for generating, based on said tracking information, C/A codes for said corresponding satellites with certain phases to said tracking channels.

7. A method comprising:
   capturing tracking information from a first plurality of satellite signals synchronously using a plurality of acquisition channels according to a plurality of correlations between a plurality of reference coarse acquisition (C/A) codes and said first plurality of satellite signals;
   generating said reference C/A codes using a first plurality of code generators to said acquisition channels;
   selecting an available acquisition channel;
   selecting an available code generator; and
   allocating said available code generator to said available acquisition channel.

8. The method of claim 7, further comprising:
   determining whether, according to said correlations, a second plurality of satellite signals are included in said first plurality of satellite signals by each of said acquisition channels; and
   capturing tracking information from instances of said second plurality of satellite signals by each of said acquisition channels.

9. The method of claim 7, further comprising:
   allocating a plurality of satellites to each of said acquisition channels; and
   instructing said first plurality of code generators to generate said reference C/A codes for said allocated satellites.

10. The method of claim 7, further comprising:
    shifting an initial phase of one of said reference C/A codes by a plurality of predetermined values; and
    calculating instances of said correlations, wherein each of said correlations is between said one of said reference C/A codes with a phase shifted by a corresponding one of said predetermined values from said initial phase and said satellite signals.

11. The method of claim 7, further comprising:
    tracking corresponding satellites synchronously using a plurality of tracking channels according to said tracking information captured from said first plurality of satellite signals; and
    selecting an available tracking channel to receive tracking information from said available acquisition channel.

12. The method of claim 11, further comprising:
based on said tracking information, generating C/A codes for said corresponding satellites with certain phases using a second plurality of code generators to said tracking channels.

13. A global positioning system (GPS) receiver, comprising:
a signal processor, said signal processor comprising:
a plurality of acquisition channels operable for capturing tracking information from a first plurality of satellite signals synchronously according to correlations between a plurality of reference coarse acquisition (C/A) codes and said first plurality of satellite signals;
a plurality of code generators; and
a configurator coupled to said generators and said acquisition channels, wherein said configurator is operable for selecting a first set of available code generators from said plurality of code generators to generate said reference C/A codes to said acquisition channels and for allocating said available code generators to said acquisition channels.

14. The GPS receiver of claim 13, wherein each of said acquisition channels determines whether, according to said correlations, a second plurality of satellite signals are included in said first plurality of satellite signals, and wherein each of said acquisition channels also captures tracking information from instances of said second plurality of satellite signals.

15. The GPS receiver of claim 13, wherein said configurator allocates a plurality of satellites to each of said acquisition channels, wherein said acquisition channels instruct said first set of code generators to generate said reference C/A codes for said allocated satellites.

16. The GPS receiver of claim 13, wherein said first set of code generators become available if said acquisition channels complete operations of capturing said tracking information from said first plurality of satellite signals.

17. The GPS receiver of claim 13, wherein each of said acquisition channels comprises:
a plurality of phase shifters, each of said phase shifters operable for shifting an initial phase of one of said reference C/A codes with a predetermined value; and
a plurality of correlation cores coupled to said phase shifters, each of said correlation cores operable for calculating instances of said correlations, wherein each of said correlations is between said one of said reference C/A codes with a phase shifted by a corresponding one of said phase shifters and said satellite signals.

18. The GPS receiver of claim 13, wherein said signal processor further comprises a plurality of tracking channels coupled to said acquisition channels and operable for tracking corresponding satellites synchronously according to said tracking information captured from said first plurality of satellite signals, wherein said configurator is further operable for selecting tracking channels to receive tracking information from said acquisition channels.

19. The signal processor of claim 18, wherein said configurator selects a second set of available code generators from said plurality of code generators to generate, based on said tracking information, C/A codes for said corresponding satellites with certain phases to said tracking channels.

20. The GPS receiver of claim 19, wherein said second set of code generators become available if said tracking channels complete operations of tracking said corresponding satellites.

* * * * *